US 6,603,655 B2

(12) United States Patent
Hrehor, Jr. et al.

(10) Patent No.: US 6,603,655 B2
(45) Date of Patent: Aug. 5, 2003

(54) ROTATING AND TRANSLATING FOUR BAR MEDIA DOOR FOR A COMPUTER CHASSIS

(75) Inventors: Robert D. Hrehor, Jr., Round Rock, TX (US); Sung H. Kim, Palo Alto, CA (US); Ronald J. Smith, Foster City, CA (US); William S. Law, San Francisco, CA (US)

(73) Assignee: Dell Products L.P., Round Rock, TX (US)

( * ) Notice: Subject to any disclaimer, the term of this patent is extended or adjusted under 35 U.S.C. 154(b) by 155 days.

(21) Appl. No.: 09/921,836

(22) Filed: Aug. 3, 2001

(65) Prior Publication Data

US 2003/0026072 A1 Feb. 6, 2003

(51) Int. Cl.[7] ................................................. G06F 1/16
(52) U.S. Cl. ...................... 361/683; 361/685; 361/725; 312/223.1; 16/366; 292/DIG. 11
(58) Field of Search ................................. 361/679–686, 361/724–727; D14/300, 314; 312/223.1–223.3; 16/366, 367, 358, 359; 292/80, 87, DIG. 11, 203, 204, 209

(56) References Cited

U.S. PATENT DOCUMENTS

| 1,115,345 | A | * | 10/1914 | Steuernagel | 16/358 |
| 1,367,954 | A | * | 2/1921 | Evans, Jr. | 16/366 |
| 2,178,908 | A | * | 11/1939 | Hudson | 16/367 |
| 3,850,464 | A | | 11/1974 | Bisbing et al. | |
| 5,351,176 | A | | 9/1994 | Smith Stephen W. et al. | |
| 5,482,333 | A | | 1/1996 | Gehrs et al. | |
| 5,570,915 | A | | 11/1996 | Asadurian | |
| 5,774,331 | A | | 6/1998 | Sach | |
| 5,815,379 | A | * | 9/1998 | Mundt | 361/683 |
| 5,926,916 | A | * | 7/1999 | Lee et al. | 361/724 |
| 6,130,822 | A | * | 10/2000 | Della Fiora et al. | 361/724 |
| 6,132,019 | A | * | 10/2000 | Kim et al. | 312/223.2 |
| 6,134,116 | A | | 10/2000 | Hoss et al. | |
| 6,219,226 | B1 | * | 4/2001 | Bullington et al. | 361/683 |

FOREIGN PATENT DOCUMENTS

EP          337558 A2  * 10/1989  ........... E05D/03/06

* cited by examiner

*Primary Examiner*—Darren Schuberg
*Assistant Examiner*—Lisa Lea-Edmonds
(74) *Attorney, Agent, or Firm*—Haynes and Boone, LLP

(57) ABSTRACT

A computer chassis includes a media access door mounted on a first surface of the chassis. The door is movable between a closed position and an open position. A first hinge portion connects the door to the chassis and permits the door to move in a rotating motion to a first open position. A second hinge portion connects the door to the chassis and permits the door to move in a translating motion along side a second surface of the chassis adjacent the first surface.

28 Claims, 5 Drawing Sheets

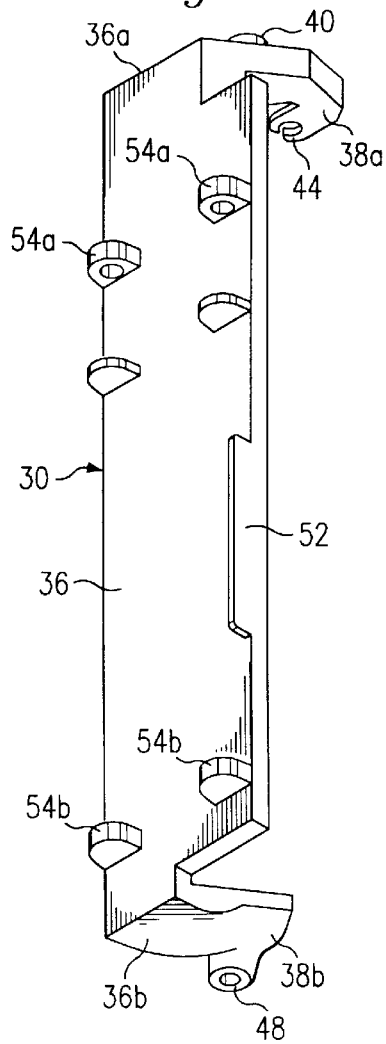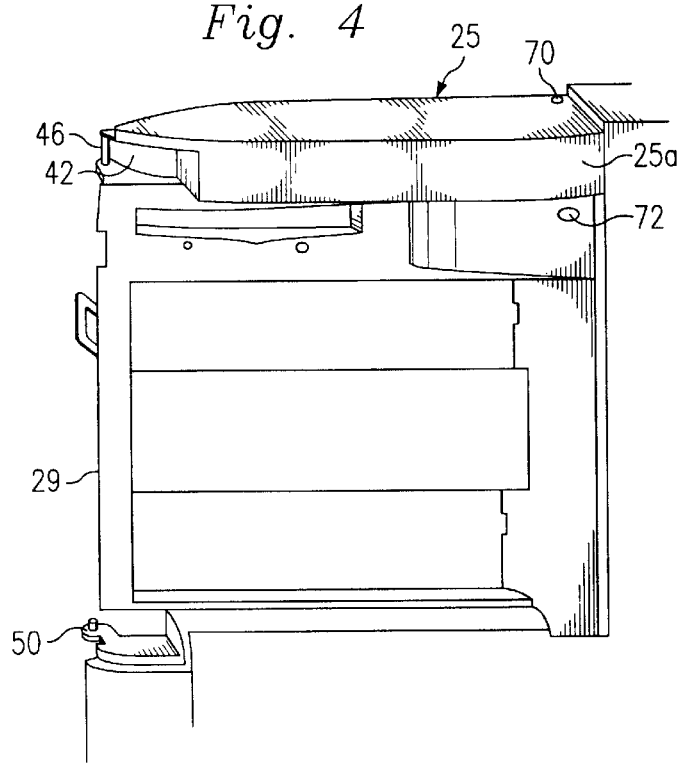

ROTATING AND TRANSLATING FOUR BAR MEDIA DOOR FOR A COMPUTER CHASSIS

BACKGROUND

The disclosures herein relate generally to computer systems and more particularly to a chassis door for covering chassis bays used for external devices.

Doors covering media devices on a computer chassis have presented problems regarding user access. Typically, such doors rotate open about 90° from a closed position. These doors cover media bays for housing external devices such as FDD's, CD's, DVD's, etc.

The need to access these media bays by opening such doors limits where and how a computer chassis can be positioned relative to the user. For example, a door that opens to the left is better suited to be placed to the left of the user, and, a door that opens to the right is better suited to be placed to the right of the user.

Such doors are also susceptible to being broken when being struck while in the open position. During manufacturing, these doors are opened and closed several times to insert and remove test media which creates extra steps and inhibits access. A door that opens more than 90° requires a larger area along a side of the chassis to allow for the motion of the door.

Doors have been provided which rotate from 90° to as much as 270° to an open position either on two separate hinges, or by sliding in a motion which moves to a position covering a portion of the front bezel of the chassis.

Therefore, what is needed is a door which is movable out of the way of the media bays and allows the chassis to be placed on either side of the user while maintaining easy access.

SUMMARY

One embodiment, accordingly, provides a door which can be easily accessed from either of the right or left sides, and can be opened in about one-half the space of a simple hinge door. To this end, a computer chassis includes an access door mounted on a first surface of the chassis. The door is movable between a closed position and an open position. A first hinge portion connects the door to the chassis and permits the door to move in a first motion to a first open position. A second hinge portion connects the door to the chassis and permits the door to move in a second motion along side a second surface of the chassis adjacent the first surface.

A principal advantage of this embodiment is that a media access door is movable to a position which provides easy access regardless of the orientation of the user to the chassis. The door is movable to the side of the chassis and can be opened in about one-half of the space of previously used media doors.

BRIEF DESCRIPTION OF THE DRAWINGS

FIG. 3 is a perspective view illustrating an embodiment of a first hinge portion.

FIG. 4 is a partial perspective view illustrating an embodiment of a front surface of the chassis.

DETAILED DESCRIPTION

Figure 1:
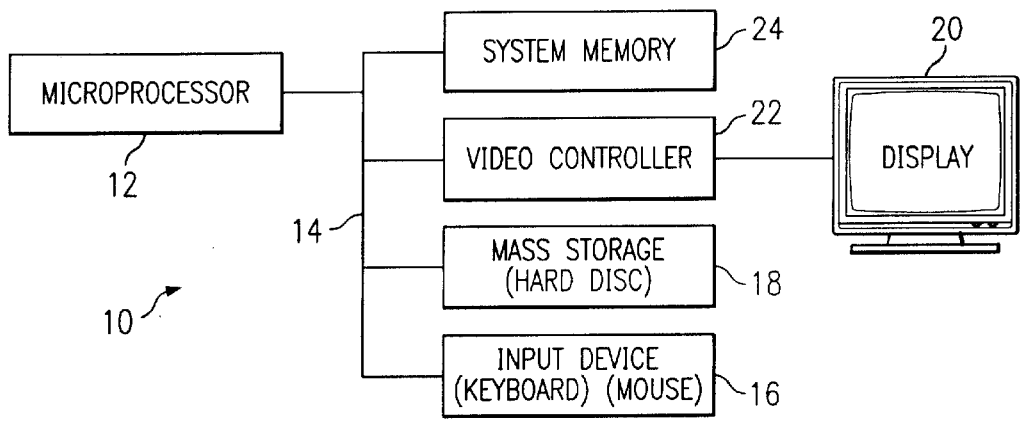
FIG. 1 is a diagrammatic view illustrating an embodiment of a computer system.

In one embodiment, computer system 10, FIG. 1, includes a microprocessor 12, which is connected to a bus 14. Bus 14 serves as a connection between microprocessor 12 and other components of computer system 10. An input system 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
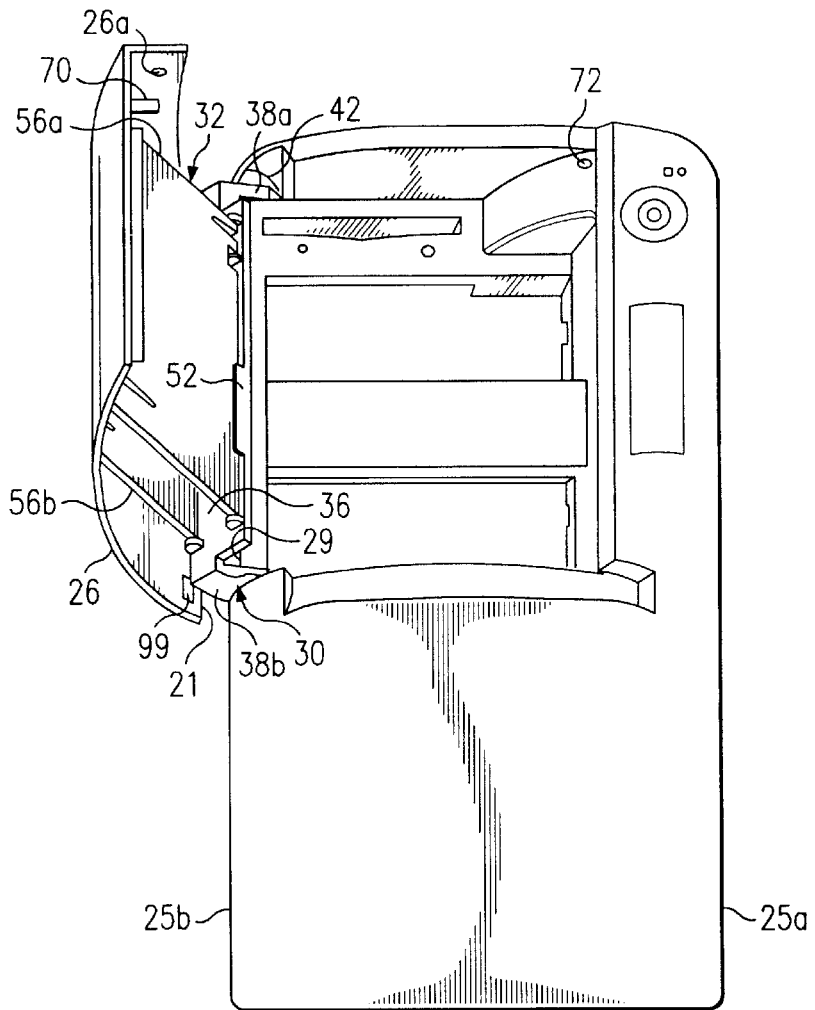
FIG. 2 is a frontal view illustrating an embodiment of a computer chassis having a media access door in an open position.

A chassis 25, FIG. 2, supports several of the components of computer system 10. Chassis 25 includes a media access door 26 mounted on chassis 25 and is movable between an open position and a closed position. A first hinge portion 30, FIGS. 2 and 3, connects a hinge edge 21 of door 26 to a hinge edge 29 of chassis 25 for permitting door 26 to move in a first pivotal motion to a first open position. A second hinge portion 32, FIG. 2, connects door 26 to the chassis 25 via the first hinge portion 30 for permitting door 26 to move to a second side of the chassis 25, adjacent the first side.

The first hinge portion 30, FIGS. 2 and 3, includes a hinge body 36 and a pair of spaced apart hinge brackets 38a and 38b. Each bracket 38a, 38b is respectively attached to opposite ends 36a, 36b of hinge body 36. A protrusion 40 extends from one of the hinge brackets 38a for contact with chassis 25 for causing hesitating movement between the door 26 and the chassis 25 when hinge bracket 38a pivots into a hinge groove 42 in chassis 25, FIGS. 3 and 4. The first hinge bracket 38a includes a break-away claw 44, for connection with a hinge pin 46 on chassis 25. Also, the second hinge bracket 38b, includes a break-away socket 48 for connection with a stud 50 extending from chassis 25. Hinge body 36 also includes a lip portion 52 extending therefrom, and further includes a plurality of socket mounts 54a and 54b. Door 26, FIG. 6, includes a plurality of socket mounts 55a and 55b.

Figure 5:
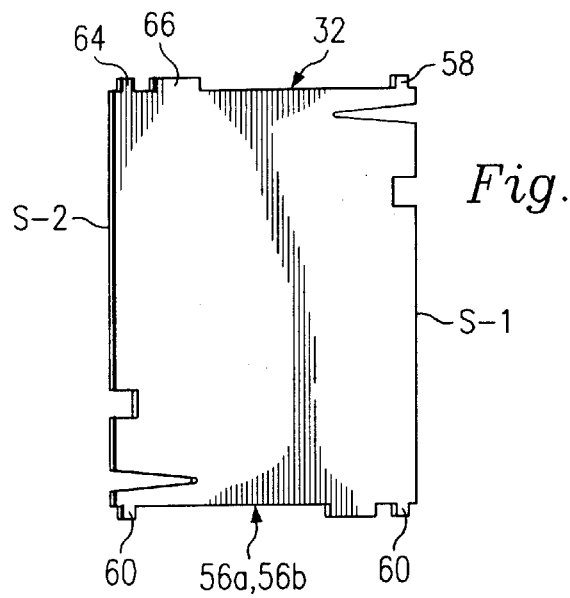
FIG. 5 is a frontal view illustrating an embodiment of a second hinge portion.

The second hinge portion 32 includes a pair of plates 56a and 56b, FIGS. 2 and 5, which interconnect door 26 with first hinge portion 30. Each plate 56a, 56b is identical and is connected to first hinge portion 30 by means of a break-away connection. As such, on one side S-1 of each plate 56a, 56b, a cantilever stud 58 connects with a respective socket mount 54a, FIGS. 3 and 5, and another stud 60 connects with a respective socket mount 54b. On another side S-2 of each plate 56a, 56b, a cantilever stud 62 connects with a respective socket mount 55b and another stud 64 connects with a respective socket mount 55a. This 4-bar latch type of connection between door 26 and first hinge portion 30 permits plate 56a to translate substantially parallel to plate 56b.

Figure 6:
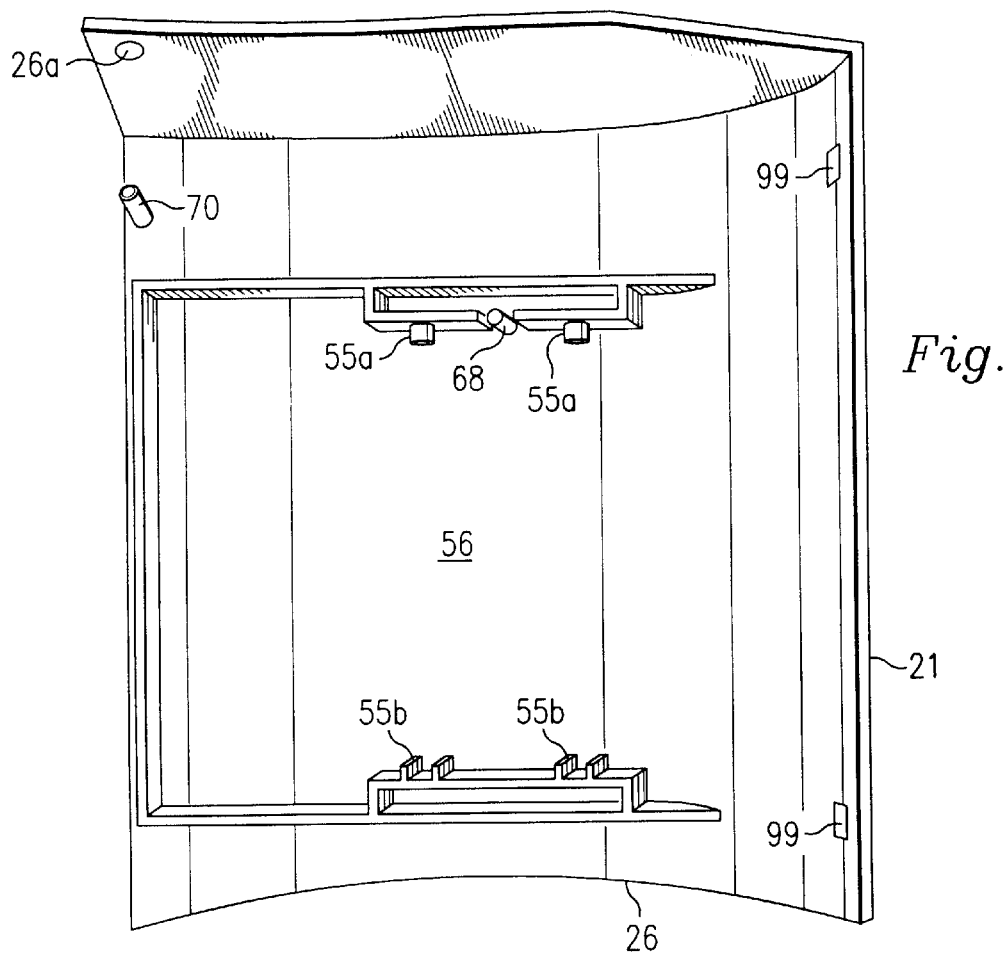
FIG. 6 is a perspective view illustrating an embodiment of the access door.

A flange 66, FIG. 5, protrudes from the plates 56a, 56b, and a cantilevered member 68 protrudes from door 26, FIG. 6, such that the flange 66 hesitatingly engages the cantilevered member 68 to interfere with movement of the door 26 relative to plates 56a, 56b. Also, a catch 70, FIG. 4, extends from chassis 25 for engaging a retainer portion 26a, FIG. 2, of door 26 to retain door 26 in a closed position. A pair of hooks 99, see FIGS. 2, 4 and 6, are provided along the hinge edge 21 of door 26. When door 26 is closed, hooks 99 engage the hinge edge 29 of chassis 25. Thus, hooks 99 keep the hinge edge 21 of door 26 engaged with the chassis 25 when the door 26 is closed. Hooks 99 totally disengage from chassis 25 when the door 26 is open.

The lip portion 52, FIGS. 2 and 3, which extends from hinge body 36, is positioned to engage plate 56a and thus limit movement of plate 56a relative to hinge body 36. A locating and alignment stud 70, FIGS. 2 and 6, on door 26, extends into a locating alignment aperture 72, FIGS. 2 and 4, formed in chassis 25 when door 26 is closed.

Figure 7:
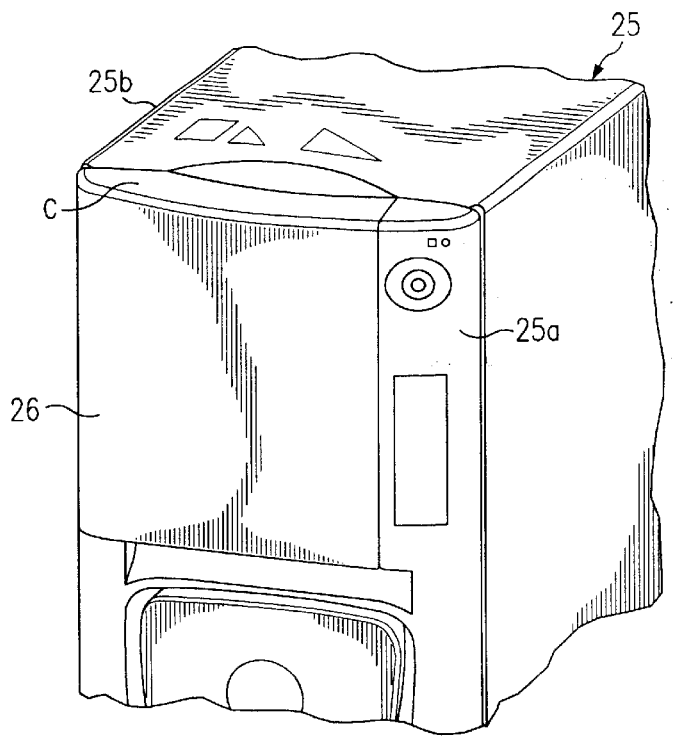
FIGS. 7–10 are views illustrating the door in various positions relative to the chassis as enabled by the first and second hinge portions.
Figure 8:
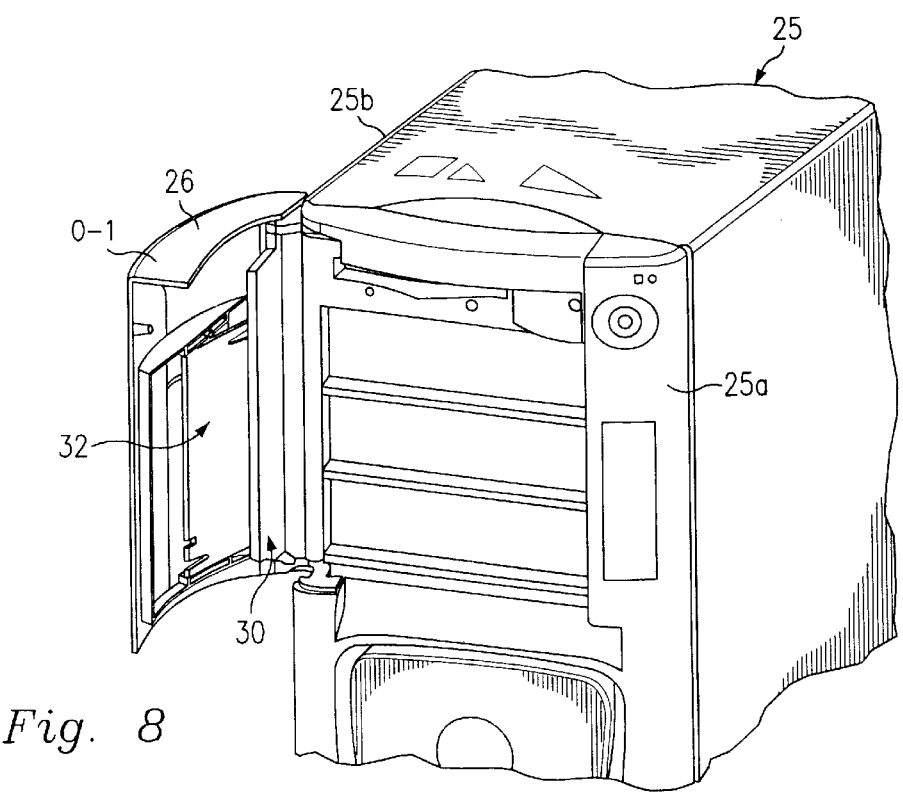
Figure 9:
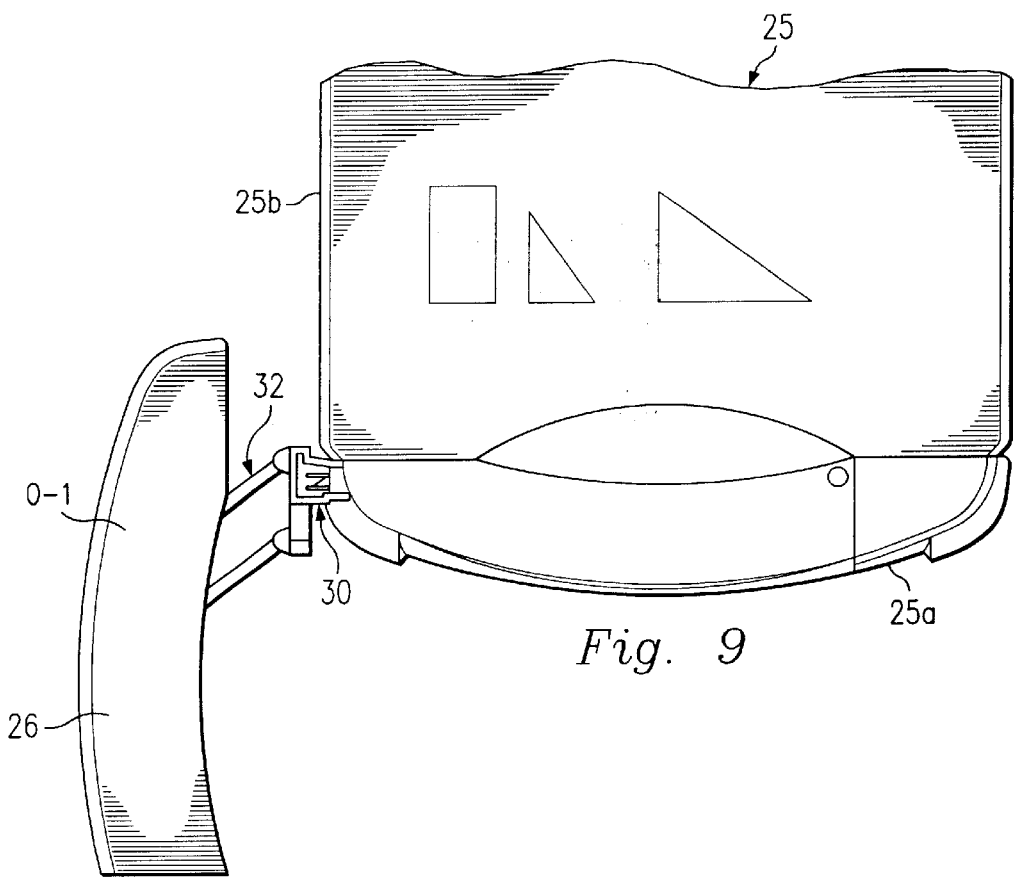
Figure 10:
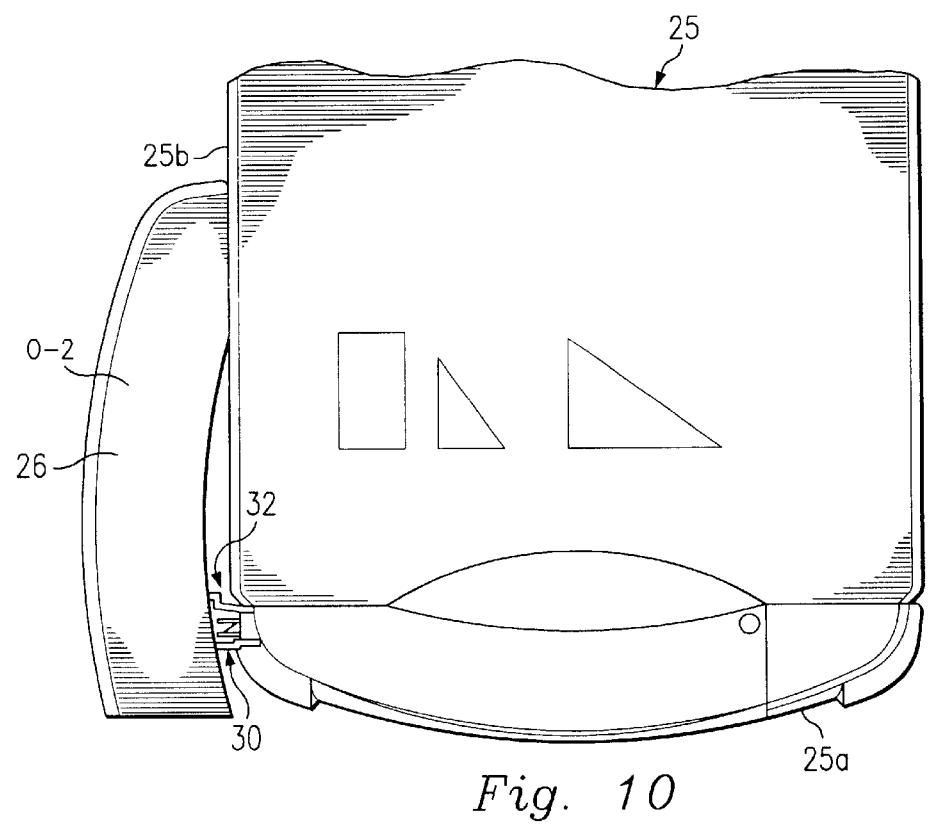

In operation, FIGS. 7–10, door 26 is in a closed position C, FIG. 7 engaged with a first side 25a of chassis 25. Door 26 pivots on first hinge portion 30 in a first pivotal motion to a first open position 0-1, FIGS. 8 and 9. Door 26 moves to a second open position 0-2, FIG. 10, adjacent a second side 25b of chassis 25, by a translating motion via second hinge portion 32. As a result, door 26 can be fully open and side-by-side with second side 25b of chassis 25, rather than being in an extended position away from chassis 25.

As can be seen, the principal advantages of these embodiments are that a media access door opens by first rotating 90° similar to a simple hinge, followed by a four bar linkage motion which permits the open door to translate to an out-of-the-way position along side the computer chassis. This dual motion provides easy access to the media bays regardless of whether the chassis is to the right or the left of the user. Also, the door opens in about one-half the space of a previously used media door.

Although illustrative embodiments have been shown and described, a wide range of modification, change and substitution is contemplated in the foregoing disclosure and in some instances some features of the embodiments may be employed without a corresponding use of other features. Accordingly, it is appropriate that the appended claims be construed broadly and in a manner consistent with the scope of the embodiments disclosed herein.

What is claimed is:

1. A media access door comprising:
    a chassis;
    an access door mounted on a first side of the chassis and movable between a closed position and an open position;
    a first hinge portion connecting the door to the chassis for permitting the door to move in a first motion to a first open position; and
    a second hinge portion connecting the door to the first hinge portion for permitting the door to move in a second motion to a second side of the chassis adjacent the first side.

2. The door as defined in claim 1 wherein the second hinge portion is connected to the first hinge portion.

3. The door as defined in claim 1 wherein the first hinge portion includes a breakaway connection to the chassis.

4. The door as defined in claim 1 wherein the first hinge portion includes a hinge body and a pair of spaced apart hinge brackets, each bracket being respectively attached to opposite ends of the hinge body.

5. The door as defined in claim 4 wherein a protrusion extends between one of the hinge brackets and the chassis for causing a hesitating movement between the door and the chassis.

6. The door as defined in claim 4 wherein the hinge body includes a lip portion extending therefrom.

7. The door as defined in claim 6 wherein the hinge body includes a plurality of mounts for the second hinge portion.

8. The door as defined in claim 1 wherein the first motion is a pivoting motion.

9. The door as defined in claim 1 wherein the door is retained in the closed position by a catch.

10. The door as defined in claim 1 wherein the second motion is a translating motion.

11. The door as defined in claim 2 wherein the second hinge portion includes a breakaway connection to the first hinge portion.

12. The door as defined in claim 6 wherein the second hinge portion includes a plurality of plates movably interconnecting the door and the first hinge portion.

13. The door as defined in claim 12 wherein a protrusion extends between at least one of the plates and the chassis door for causing a hesitating movement between the door and the plates.

14. The door as defined in claim 12 wherein each plate moves substantially parallel to each other plate.

15. The door as defined in claim 11 wherein the breakaway connection of the second hinge portion includes a cantilever extension.

16. The door as defined in claim 3 wherein the breakaway connection of the first hinge portion includes a claw extending from a hinge bracket.

17. The door as defined in claim 14 wherein the movement of the plates is limited by the lip.

18. The door as defined in claim 1 wherein the chassis has a hinge edge and the door has a hinge edge.

19. The door as defined in claim 18 wherein the hinge edge of the door includes at least one hook for engagement with the hinge edge of the chassis.

20. A computer housing door comprising:
    a computer housing;
    an access door mounted on a first surface of the housing and movable between a closed position and an open position;
    a first hinge portion connecting the door to the housing for moving the door in a pivoting motion to a first open position;
    a second hinge portion connecting the door to the first hinge portion for moving the door in a translating motion to a second open position side-by-side with a second surface of the housing.

21. The door as defined in claim 20 further comprising:
    means for holding the door in the closed position.

22. The door as defined in claim 20 further comprising:
    means for permitting the first hinge portion to break away from the housing.

23. The door as defined in claim 20 further comprising:
    means for permitting the second hinge portion to break away from the first hinge portion.

24. The door as defined in claim 20 further comprising:
    means for causing a hesitating movement between the door and the housing.

25. The door as defined in claim 20 further comprising:
    means for causing a hesitating movement between the door and the plates.

26. The door as defined in claim 20 further comprising:
a pair of substantially parallel plates in the second hinge portion; and
means for limiting movement of the plates.

27. A computer system comprising:
a chassis;
a microprocessor mounted in the chassis;
a storage coupled to the microprocessor;
an access door mounted on a first side of the chassis and movable between a closed position and an open position;
a first hinge portion connecting the door to the chassis for permitting the door to move in a first motion to a first open position; and
a second hinge portion connecting the door to the first hinge portion for permitting the door to move in a second motion to a second side of the chassis adjacent the first side.

28. A methond of opening a computer housing door comprising:

providing a computer housing;

mounting an access door on a first surface of the housing for movement between a closed position and an open position;

connecting a first hinge portion of the door to the housing for moving the door in a pivoting motion to a first open position pivoted away from the first surface; and connecting a second hinge portion of the door to the first hinge portion for moving the door in a translating motion to a second open position side-by-side with a second surface of the housing.

* * * * *